United States Patent [19]

Chapelle et al.

[11] 4,364,239

[45] Dec. 21, 1982

[54] HOT WATER SUPPLY APPARATUS COMPRISING A THERMODYNAMIC CIRCUIT

[75] Inventors: Jules A. Chapelle, Orsay; Jean-Pierre Levacher; Emile Sanzey, both of La Courneuve; Pierre Vironneau, Toulouse, all of France

[73] Assignee: Electricite de France (Service National), France

[21] Appl. No.: 275,191

[22] Filed: Jun. 19, 1981

[30] Foreign Application Priority Data

Jun. 20, 1980 [FR] France .................................. 80 13831

[51] Int. Cl.³ .............................................. A63C 19/10
[52] U.S. Cl. .................................. 62/235.1; 62/238.6
[58] Field of Search ............................ 62/235.1, 238.6

[56] References Cited

U.S. PATENT DOCUMENTS

| | | | |
|---|---|---|---|
| 4,011,731 | 3/1977 | Meckler | 62/235.1 |
| 4,049,045 | 9/1977 | Moog et al. | 62/238.6 X |
| 4,111,259 | 9/1978 | Lebduska | 62/235.1 X |
| 4,123,003 | 10/1978 | Winston | 62/235.1 X |
| 4,285,333 | 8/1981 | Tanaka et al. | 62/235.1 X |

Primary Examiner—Lloyd L. King
Attorney, Agent, or Firm—Larson and Taylor

[57] ABSTRACT

A hot water supply apparatus comprises a thermodynamic circuit having a compressor, a condensor for heat exchange between the thermodynamic fluid in the circuit and a high temperature source. That circuit further includes an evaporator arranged for heat exchange with a non-freezable heat carrying fluid which is circulated in a solar energy collecting circuit. A tank receives a body of water for heat storage. An heat exchanger is arranged in the circuit for circulation of the heat carrying fluid and is physically located above the tank. It may be combined with the evaporator. A pump directs a flow of water from the storage tank to sprinkling means associated with the heat exchanger whereby the apparatus operates as ice manufacturing device under severe cold conditions, when there is insufficient heating energy available from the sun.

13 Claims, 5 Drawing Figures

HOT WATER SUPPLY APPARATUS COMPRISING A THERMODYNAMIC CIRCUIT

BACKGROUND AND SUMMARY OF THE INVENTION

The present invention relates to an apparatus for supplying hot water comprising a thermodynamic system having compressor means, a condenser constituting the high temperature source associated with heat exchange means for transferring heat to a hot-water circuit, an expansion valve and heat-exchange evaporator means for heat exchange with a liquid constituting a cold source.

Numerous installations of that type are known for producing hot water for industrial or domestic needs (supply of sanitary or heating water more especially).

When the heating needs are the highest, i.e. when the ambient temperature is lowest (typically in winter), the performance coefficient of the heat pump drops and may approach 1 when the cold source is at the temperatures usually available at that time. The "performance coefficient" is the ratio between the thermal energy supplied to the heat source by the apparatus and the overall electric energy supplied to the apparatus, particularly to the compressor thereof.

There is disclosed in French Pat. No. 2,439,954 an apparatus of the kind having a thermodynamic circuit through which flows a refrigerant or thermodynamic fluid in liquid and vapor phases; the circuit comprises a compressor unit, a condenser for heat-exchange with a high temperature source for transferring heat to a hot-water circuit, an expansion valve and an evaporator for heat-exchange with a circuit in which flows a heat-carrying liquid of a cold source including a sun energy collector for heating said heat-carrying liquid, thermal storage being ensured by the latent freezing heat of a body of water contained in a tank. Means for heat exchange between the heat carrying liquid and water comprise an exchanger immersed in the body of water. This arrangement leads to freezing of the water as a solid body during severe cold, which creates problems of deicing, of guaranteeing operation and of excessive time for returning to a high performance coefficient.

A solar radiation collector using the greenhouse effect for heating water which flows in exchangers has been described in German specification No. 2,649,872. But solar radiation has disadvantages: it is not available at night; in the daytime it is uncertain.

It is an object of this invention to provide an improved apparatus for supplying hot water; it is a more particular object to achieve a performance of merit coefficient substantially higher than 1 and to overcome the uncertainties of solar heating.

To this end, an apparatus of the above-defined kind has heat exchange means placed in the heat-carrying circuit above the storage tank, associated with a pump for taking water from said body and feeding it to distributor means for sprinkling said water on said exchange means. The apparatus consequently forms an ice works when the solar energy make-up becomes insufficient. Defrosting means are provided for melting the ice in contact with the exchange means with heat energy taken from the apparatus. That energy may be that delivered by the solar exchanger and stored; the apparatus may be designed so that heat make-up may be supplied exceptionally by the water of the water-distribution network.

In a particular embodiment, the heat exchange means and the evaporator form a same unit placed above the tank. This arrangement presents advantages as regards the performance coefficient which it is possible to obtain.

In a modified embodiment, the heat exchange means, disposed above the tank, are separate from the evaporator, in which heat exchange takes place between the thermodynamic fluid and the heat-carrying liquid. Then, to reduce the temperature difference between the water in the tank and the thermodynamic fluid to an acceptable value and to compensate for continuous operation of the pump of the solar exchanger, the heat exchanger is given an exchange area substantially greater than that required in the case of the preceding embodiment. On the other hand, the exchanger is of simpler construction and may be constructed by low-cost processes, with materials of moderate cost. An exchanger may further be used made from modules formed from laminated aluminium or light-alloy sheets provided with contact bosses and forming a flow circuit for the unfreezable fluid. Each of these modules may be obtained by the so-called "roll-bond" laminating and securing technique.

The invention will be better understood from the following description of particular embodiments thereof given by way of examples only.

SHORT DESCRIPTION OF THE DRAWINGS

Figure 3:
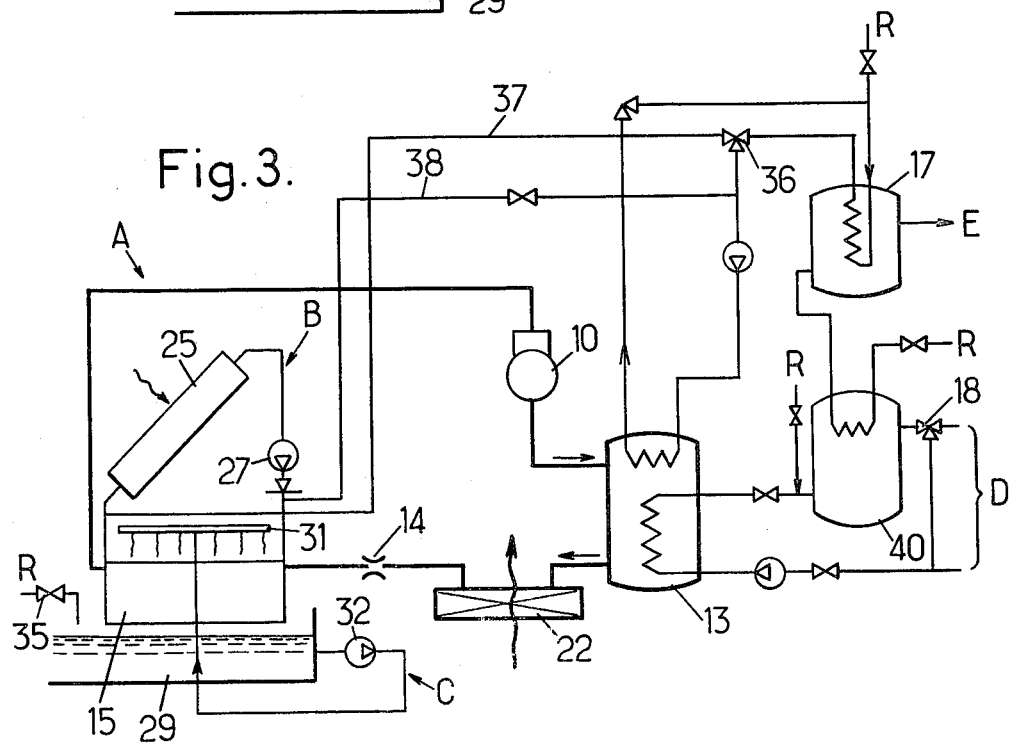
Figure 2:
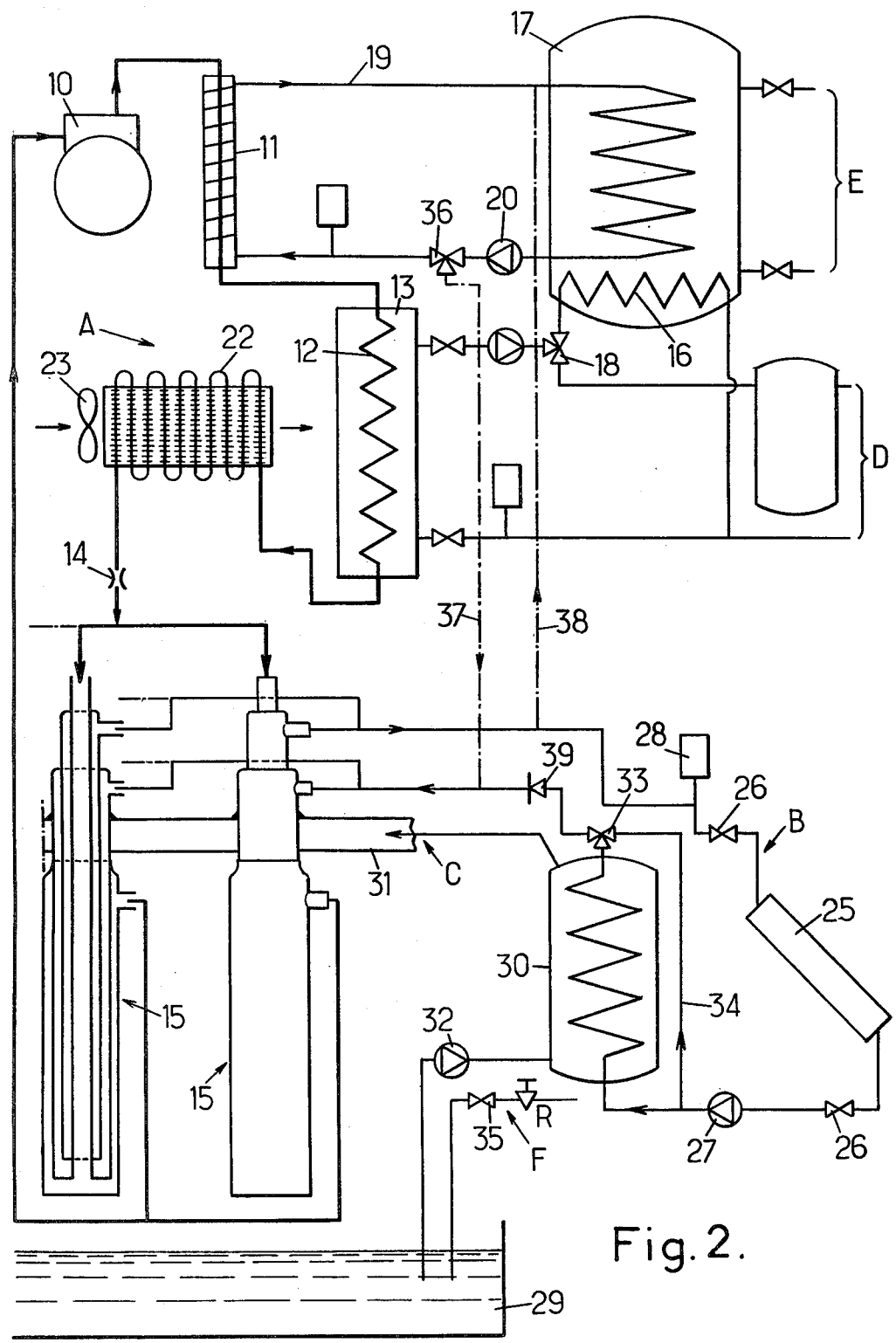
FIG. 2 is a diagram, more detailed than that of FIG. 1, showing a possible actual arrangement of the embodiment shown schematically in FIG. 1.
Figure 4:
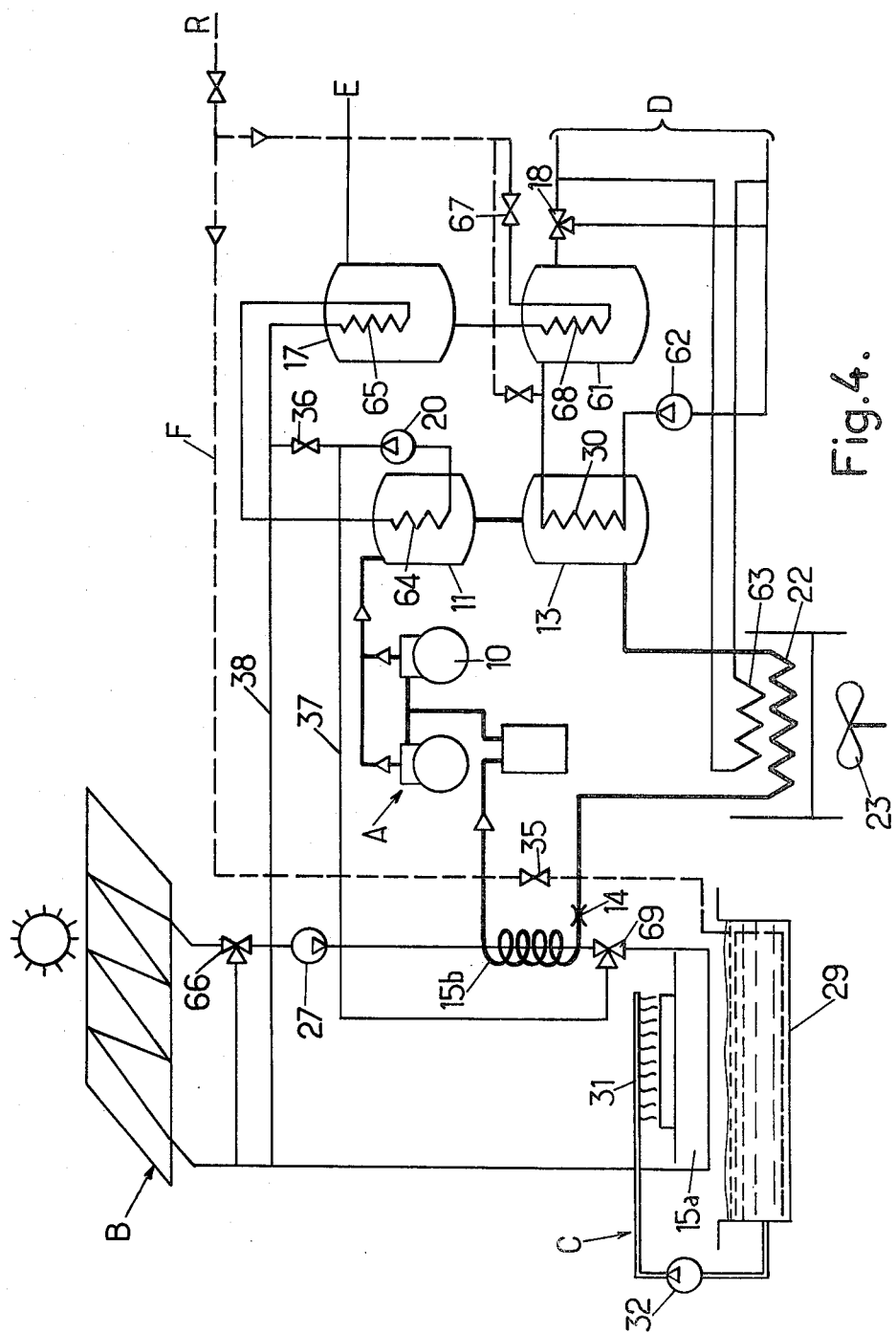
Figure 5:
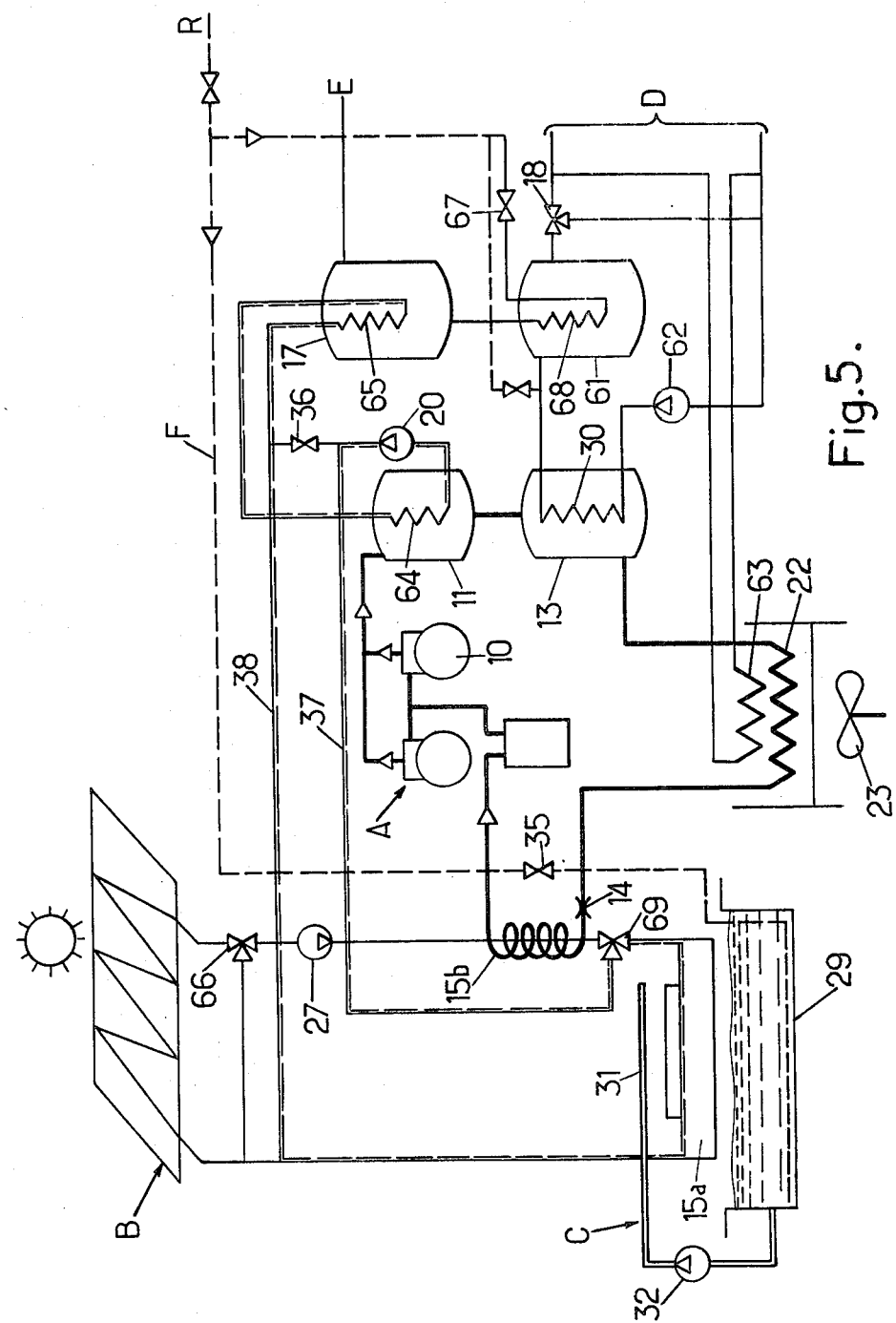

FIG. 3, similar to FIG. 2, shows an embodiment having a modified design of the evaporator-exchanger; and FIGS. 4 and 5 are schematic representations of another embodiment in which the evaporator of the thermodynamic circuit is distinct from the heat exchange means, respectively during normal operation and during defrosting.

DETAILED DESCRIPTION OF PREFERRED EMBODIMENTS

Figure 1:
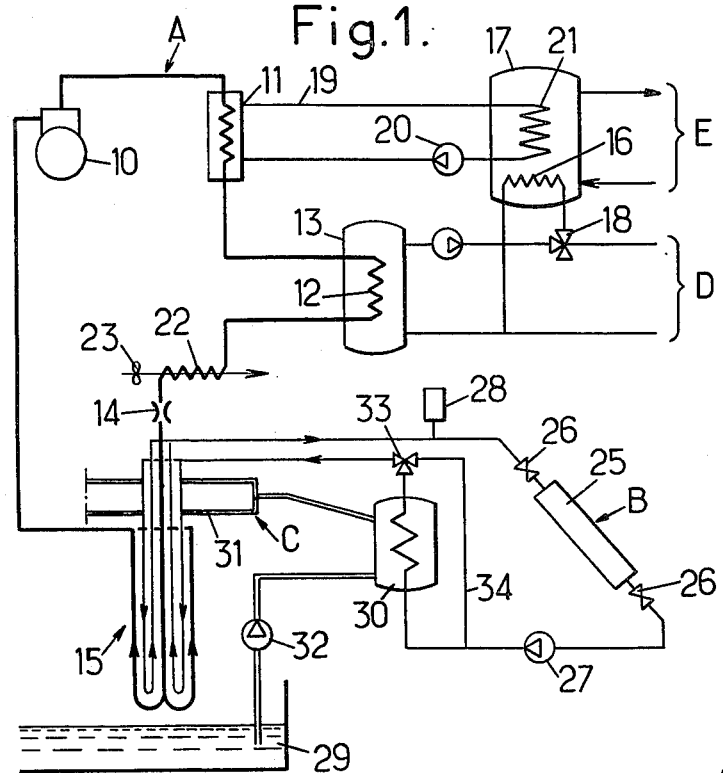
FIG. 1 is a simplified diagram showing the principal components of an apparatus according to a first embodiment.

For clarity, different circuits in the apparatus shown in FIG. 1 are shown with lines of different thickness. Three main circuits are provided, which may be termed thermodynamic circuit A, solar circuit B and intermediate hydraulic circuit C. They will be described successively.

The thermodynamic circuit A comprises in succession, along the direction of flow of the thermodynamic fluid which will generally be a fluorine compound of the kind known under the trade mark "FREON", a compressor unit 10, a desuperheating exchanger 11, a tube bundle 12 of a condenser 13, an expansion valve 14 and an evaporator-exchanger 15. Condenser 13 and evaporator-exchanger 15 operate by heat exchange, respectively with a hot source and a cold source.

In the illustrated embodiment, the high-temperature source may be either a heating-water circuit D, or the bundle of heating-pipes 16 of a hot-water tank 17 belonging to a sanitary hot-water circuit E. A three-way valve 18 is provided for connecting condenser 13 either to the heating-water circuit D (winter operation), or to the pipe bundle 16 for producing sanitary hot water (summer operation). An intermediate flow loop 19 having a pump 20 is provided for transferring heat from the desuperheating exchanger 11 to a pipe coil 21 immersed in the hot-water tank 17 of the hot-water circuit; in a modified embodiment, the hot water tank 17 has the same volume, but is of smaller diameter and greater height so as to achieve thermal segregation which allows loop 19 to operate as a thermosyphon without a pump 20.

The apparatus shown in FIG. 1 further comprises a finned exchanger 22 associated with an air-circulation blower 23 and placed between condenser 13 and expansion means 14. It allows hot air to be supplied for air conditioning premises from cold air taken from outside, at least during winter operation.

The solar circuit B comprises an exchanger 25 or, more generally, a bank of exchangers each provided with an isolating valve 26, a pump 27 and an exchanger which, in the case illustrated in FIG. 1, is combined with evaporator 15 to constitute a built-in unit. The solar exchanger does not use the greenhouse-effect and does not comprise a front glass and insulation. It recovers the energy of solar radiation and the sensible heat of the ambient air when it operates below the ambient temperature. Solar circuit B is filled with a fluid which remains in liquid phase under all operating conditions. As a general rule, a mixture of water and an antifreeze such as ethylene-glycol will be used. An expansion tank 28 is provided in the circuit, since the liquid will operate within a substantial temperature range.

The evaporator exchanger unit 15 is located above the storage tank 29, in an "ice-manufacturing" configuration. The intermediate hydraulic circuit C forms a heat recharge circuit for tank 29. Water flows therethrough and it allows heat energy to be stored by using the latent heat of the water-ice change. Circuit C comprises a pump 32 which draws water from storage tank 29 and feeds it to sprinkler means 31 from which the water streams over the exchanger and fall back into the tank.

The pumps and electromagnetically controlled valves of the circuit are associated with a control system (not shown) for operating the apparatus as follows:

When the temperature of the heat-carrying liquid which flows through circuit B is greater than 0°, pump 27 is continuously energized. Pump 32 feeds water from tank 29 to the sprinkler means 31 from which it flows down on the evaporator exchanger 15 and returns to tank 29. Pump 32 operates as long as the temperature of the water in tank 29 is above that of the heat-carrying liquid. There is then accumulation of solar energy in the form of heating of the body of water in tank 29.

As soon as the temperature of the heat-carrying liquid which flows through circuit B decreases to 0° C., pump 32 stops automatically. The operation of pump 27 is servo-controlled responsive to operation of compressor 10, as long as the temperature of the heat-carrying liquid in circuit B corresponds to a performance coefficient greater than a predetermined threshold, equal to 2.5 for example.

As soon as the temperature of the fluid in circuit B drops below this threshold, pump 27 is stopped. Pump 32 is on the other hand started again and its operation is slaved to that of compressor 10. The water discharged by sprinkler 31 is then partially transformed into ice.

Finally, when the evaporation pressure of the thermodynamic circuit A reaches the minimum value corresponding to the minimum performance coefficient chosen beforehand, a cyclic defrosting system is brought into action. This system may use several possible heat sources, for example the thermal storage formed by the water of hot-water tank 17.

If, before defrosting becomes necessary, circuit B again supplies heat-carrying liquid at a temperature greater than 0° C., following a sunshine renewal, normal operation is resumed and causes, without a special deicing operation, the ice in contact with the evaporator exchanger to melt, the film of water thus formed causing the ice to fall into tank 29. The ice collected in tank 29 melts progressively as the heat-carrying fluid of circuit B heats up and supplies the heat to the evaporator exchanger and to the streaming water.

By way of example, the following numerical values can be given which have been chosen for a domestic heating and hot-water production installation.

Thermodynamic circuit A is designed so that the limit temperatures of the fluorine-compound fluid are the following: saturating vapor temperature at evaporator 15, from −10° C. to +10° C.; saturating vapor temperature at condensation, from +25° C. to +55° C.

The solar circuit is designed so that the temperature of its heat-carrying fluid, formed by glycol-containing water, may vary from −20° C. to +60° C.

The temperature of the heating water available in circuit D should be between +20° C. and +50° C.

The temperature of sanitary water in circuit E should be maintained at +50° C. at the output of hot-water tank 17 until a rate of drawing off of 100 liters at a flow rate of 100 liters/minute, compatible in practice with a mains water temperature between +5° C. and +15° C.

The control system, not shown, will generally control in addition the heating-water circuit D and will regulate the distribution temperature of this water depending on the outside temperature, generally following a linear law of variation.

Such an apparatus has proved to be such as to provide in all cases a performance coefficient at least equal to 2.5.

FIG. 2 shows, again schematically, the complete construction of an apparatus of the kind already described with reference to FIG. 1, and shown in the "ice manufacture" configuration. The parts in FIG. 2 corresponding to those of FIG. 1 are shown by the same reference number; they will not be described again.

Thermodynamic circuit A has a construction similar to that shown in FIG. 1 but comprises several evaporator-exchangers 15 formed by concentric tubes mounted in parallel and placed above tank 29 so as not to dip into the mass of water. Unit 10 is advantageously formed from several power-driven compressor units mounted in independent circuits, having the same power or better still, if they are two in number, having respectively powers equal to ⅓ and ⅔ of the total power. Thus, the electric power supplied may be matched to the heating needs. The compressor are of a type whose electric drive motor is cooled by the gases sucked in. The desuperheater exchanger 11 may be of conventional construction. The condenser may be of the helical multitubular type, subjecting the thermodynamic fluid to a pressure drop less than 0.15 bar. This condenser should be insulated to limit heat losses. The expanding valve 14 will be of the thermostatic type, with pressure limitation corresponding to the highest evaporation temperature (a representative range of evaporation temperatures being −15° C. to +12° C.). The evaporator-exchangers 15 may be formed from copper tubes and designed so as to impose on the refrigerating fluid of the thermodynamic circuit A a very small pressure drop, typically less than 0.08 bar, and a pressure drop on the hydraulic circuits less than 2 m of water.

The intermediate loop 19, which avoids direct exchange between the refrigeration fluid of circuit A and the sanitary water of circuit E, may be flown by the same liquid as that which forms the heat-carrying liquid in solar circuit B.

FIG. 2 further shows a circuit F for make-up water coming from the water mains network R, comprising a valve 35 which feeds additional mains water into tank 29 as soon as the maximum ice storage capacity is reached. Opening of this valve 35 is controlled by a system, not shown, detecting the ice volume.

FIG. 2 shows further one of the possible embodiments of the deicing system with which the installation must be equipped. This system comprises a three-way valve 36 for diverting liquid which flows through intermediate loop 19 towards the evaporator exchanger 15. When valve 36 is brought into the defrosting position, the liquid which has flown through hot-water tank 17 no longer passes through the desuperheater exchanger 11, but follows a circuit comprising valve 36, a by-pass conduit 37, the heat-carrying liquid circuit of evaporator-exchangers 15 and a second bypass conduit 38. A non-return valve 39 prevents the liquid from returning to circuit B.

The apparatus shown schematically in FIG. 3 (where the parts corresponding to those already described are designated by the same reference number) essentially differs from the preceding one in that the evaporator-exchangers mounted in parallel are flat and constructed in accordance with the "roll-bond" technique consisting in laminating four aluminum sheets together so as to define interleaved thermodynamic A and solar B circuits. Circuit B delivers the heat collected by the solar exchangers 25 to an exchanger, again combined with evaporator 15, disposed above the water-storage tank 29. Circuit C comprises a lift pump 32 which feeds a sprinkling or water delivering line 31 disposed at the upper part of the elements forming evaporator-exchanger 15.

In the embodiment of FIG. 3, several compressors may be mounted in the same thermodynamic circuit. Again the apparatus has a deicing circuit for flowing warm fluid coming from the circuit for heating the sanitary hot water 17 in evaporator-exchanger 15, through conduits 37 and 38 and a three-way valve 36. Last, the apparatus comprises a buffer tank 40 for storing hot water.

Operation of the apparatus is similar to that described with reference to FIGS. 1 and 2. From the output of compressor 10, the high temperature vapor successively circulates through a desuperheater exchanger for heating an intermediate circuit, then a condenser 13 where it is condensed. The warm liquid leaving condenser 13 is cooled, before expansion in expansion valve 14, in an exchanger 22 which heats the replacement air for the premises, for example from −7° C. up to a temperature greater than +30° C. Due to that lower temperature of the thermodynamic fluid in liquid phase at the output of the condenser, the minimum performance coefficient may be brought up to a value of 2.5 and often even 3.

According to a modification, the flat elements of the evaporator exchanger may be formed as cylinders.

The apparatus may be constructed as a heat-producing built-in unit, comprising the whole of the thermodynamic circuit, to which the solar exchangers and the hot-water tanks are connected.

Referring now to FIGS. 4 and 5, there is shown an embodiment in which the heat-exchange means are dissociated from the evaporator. For easier understanding, the parts in FIGS. 4 and 5 which correspond to those already shown in FIGS. 1 to 3 are designated by the same reference number. In FIGS. 4–5, the thermodynamic circuit A through which the thermodynamic fluid flows is shown with thick lines and the intermediate hydraulic circuit C, serving for the heat recharging of the storage tank, is shown by double lines.

The thermodynamic circuit A again comprises, in succession in the direction of flow of the thermodynamic fluid, a compressor unit 10 with two compressors in parallel relation, a desuperheating heat remover 11, a condenser 13 forming store of warm thermodynamic liquid, an expansion valve 14 and an evaporator 15b. Condenser 13 and evaporator 15b operate by heat exchange, respectively with a hot source formed by a tube stack immersed in condenser 13, and with a cold source.

The apparatus as shown further comprises an exchanger 22 associated with an air circulation blower 23 and placed between the condenser 13 and expansion valve 14, for supplying in winter warm air for air-conditioning premises, from cold air taken from outside.

In the embodiment shown in FIGS. 4 and 5, the hot source, which the installation must supply with heat, is formed by a tube stack 30 immersed in condenser 13 forming a reserve of thermodynamic fluid. Tube stack 30 belongs to a hot-water circuit comprising a buffer hot-water tank 61, a three-way valve 18 and a circulating pump 62. The circulating pump 62 and valve 18 allow flow to be organized in closed circuit, so as to increase the temperature of the body of water in tank 61. In winter, valve 18 supplies a heating hot-water circuit D. With the closed circuit there is also associated a loop comprising a tube stack 63 for heat exchange with the air circulated by blower 23.

The heat taken from the thermodynamic fluid by the exchange tube stack 64 of the desuperheater 11, which also ensures at least partial condensation, is used for heating the sanitary hot water contained in a hot-water tank 17 for a circuit E. A circulator 20 and an electromagnetic valve 36 enable closed-circuit circulation to be established in an intermediate loop comprising tube stack 65 placed in hot-water tank 17.

Solar circuit B is filled with a fluid chosen so as to remain in liquid phase under all operating conditions, for example a mixture of water and antifreeze. This circuit B comprises at least an exchanger 25, a circulator 27, the part through which flows the unfreezable fluid of evaporator 15b, and an exchanger 15a. A three-way valve 66 allows the solar exchanger to be short-circuited. This latter should again not be confused with a glasshouse-effect solar collector. It serves to collect indirect solar energy as well as direct solar radiation. Contrary to the usual solar collectors, which use solar radiation for raising the temperature of a fluid to a temperature of use, the solar exchanger used in the installation of the present invention may be without glasses and without heat insulation, the function of raising the heat level of the solar energy absorbed being provided by the thermodynamic circuit.

Exchanger 15a is disposed above tank 29, which may be replaced by a buried tank, and contains a mass of water whose latent solidification heat provides a thermal storage. An intermediate hydraulic circuit, forming a heat recharge circuit for storage tank 29, comprises a lift pump 32 feeding a sprinkler 31 from which the water may stream over exchanger 15a. This water may either return to the tank after being heated or cooled on the exchanger, or be transformed into ice in contact with the exchanger.

Finally, the installation comprises in addition a circuit F for make-up water coming from the water mains network R, comprising a valve 35 for feeding the additional mains water into tank 29 as soon as the maximum ice-storage capacity is reached and a valve 67 for making up the sanitary hot water drawn off. The input of water for making up that drawn off takes place, in the case illustrated in the figures, through a coiled tube 68 for heat exchange with the water contained in the buffer hot-water tank 61.

The operation of the apparatus which has just been described is to a great extent similar to that of the installation shown in FIGS. 1 to 3. Consequently, it will only be indicated briefly.

Operation during mild weather periods (FIG. 4):

Pump 27 is in permanent operation and causes the heat-carrying fluid to flow in the whole of circuit B, i.e. through evaporator 15b, of conventional construction, exchanger 15a and the solar collector 25. The three-way valve 66 closes the conduit bypassing exchanger 25. Pump 32, controlled by a circuit comparing the temperature of the water in tank 29 with that of the heat-carrying fluid in circuit B, feeds water from tank 29 to the sprinkler 31 from which it streams over the exchanger, is heated and returns to the tank, as long as the temperature of the water in the tank is less than that of the heat-carrying fluid. There is accumulation of solar energy in the form of the heating of the body of water in tank 29. Valve 18 is positioned so as to create a closed circulation circuit comprising 30, 61 and 62.

Pump 32 stops automatically as soon as the temperature of the heat-carrying fluid in exchanger 15a ceases to be greater than 0° C.

Operation during severe weather periods, with ice manufacture on the exchanger:

As soon as the temperature of the liquid in circuit B drops below a threshold corresponding to a minimum performance coefficient, pump 32 is again started up and the water discharged by sprinkler 31 is partially transformed into ice which progressively covers the walls of exchanger 15a. Pump 27 continues to operate and to transfer the heat collected in the form of latent vaporization heat on exchanger 15a to evaporator 15b. The heat released in excessive-heat remover-condenser 11 is transferred to the hot-water tank 17 by a circuit comprising circulator 20, valve 36 then open, the tube stack 65 plunging into hot-water tank 17 and the tube stack 64.

Defrosting

When the evaporation pressure of the thermodynamic circuit A reaches the value corresponding to the minimum performance coefficient chosen beforehand, a cyclic deicing system is brought into action and leads to the configuration illustrated in FIG. 5. It uses as heat source the storage formed by the thermodynamic liquid in the desuperheater condenser 11 and the hot water in hot-water tank 17. Valve 36 is then closed, circulator 20 is brought into action and the three-way valves 66 and 69 are positioned so as to form a closed loop comprising pump 20, valve 69, exchanger 15a and tube stacks 65 and 64. It can be seen that this operation leads to connecting circuit B and the heat-transfer circuit between hot-water tanks 11 and 17, which involves their using the same heat-carrying fluid, which will generally be water to which an antifreeze has been added. The circulation of hot water in exchanger 15a causes the ice to melt in contact with the walls of the exchanger. Pieces of ice drop into tank 29 and the normal operating cycle may be resumed.

We claim:

1. A hot water supply apparatus comprising:
a thermodynamic circuit A containing a thermodynamic fluid in liquid and vapor phases, having compressor means, condensor means for heat exchange between said thermodynamic fluid and a high temperature source including a hot water circuit, expanding valve means and evaporator means arranged for heat exchange with a non-freezable heat carrying liquid,
a cold source comprising solar exchanger means, and a circuit for circulation of said heat carrying liquid,
a tank for receiving a body of water for heat storage,
heat exchange means arranged in said circuit for circulation of said heat carrying fluid and physically located above said tank,
pumping means for directing a flow of water from said tank to sprinkling means associated with said heat exchange means, whereby the apparatus operates as a ice-manufacturing device under severe cold conditions and insufficient solar heating,
and defrosting means for melting ice in contact with said heat exchange means with heat taken from the apparatus.

2. Apparatus according to claim 1, wherein said heat exchange means are associated with said evaporator means in a common unit.

3. Apparatus according to claim 2, wherein said common unit comprises a plurality of concentric cylindrical walls.

4. Apparatus according to claim 1, wherein said heat exchange means located above the tank are separate and distinct from the evaporator means in which there is heat exchange between the thermodynamic fluid and the heat carrying fluid.

5. Apparatus according to claim 1, wherein said heat exchange means comprises assemblies formed of aluminum or light alloy sheets which are colaminated and provided with contacting bosses to form at least one heat carrying liquid flow circuit.

6. Apparatus according to claim 5, wherein said sheets additionally define a thermodynamic fluid circulation circuit.

7. Apparatus according to claim 5, wherein each assembly is obtained by the roll-bond process.

8. Apparatus according to claim 6 or 7, wherein said assemblies are of flat or arcuate form.

9. Apparatus according to claim 1, 2 or 4 wherein said deicing means have a circuit for circulation of warm fluid from said high temperature source.

10. Apparatus according to claim 1, 2 or 4, further comprising deseparating means located on the thermodynamic fluid circuit downwardly of the compressor means, said desuperheating means being associated with an intermediate hydraulic loop for water heating.

11. Apparatus according to claim 10, wherein said intermediate loop contains a fluid of the same type as the heat carrying fluid.

12. Apparatus according to claim 1, 2 or 4, further comprising an air heating exchanger located on the circuit of the thermodynamic fluid directly upstream of the expander means.

13. Apparatus according to claim 1, 2 or 4, wherein said compressor means comprises a plurality of compressors whose overall power corresponds to the maximum power to be delivered by the apparatus.

* * * * *